(12) United States Patent
Lane

(10) Patent No.: US 11,679,736 B2
(45) Date of Patent: Jun. 20, 2023

(54) PORTABLE SEATBELT SYSTEMS, KITS, AND METHODS

(71) Applicant: Toni Yvonne Lane, Indianapolis, IN (US)

(72) Inventor: Toni Yvonne Lane, Indianapolis, IN (US)

( * ) Notice: Subject to any disclaimer, the term of this patent is extended or adjusted under 35 U.S.C. 154(b) by 0 days.

(21) Appl. No.: 17/537,229

(22) Filed: Nov. 29, 2021

(65) Prior Publication Data

US 2022/0306041 A1 Sep. 29, 2022

Related U.S. Application Data

(60) Provisional application No. 63/118,889, filed on Mar. 24, 2021.

(51) Int. Cl.
*B60R 22/02* (2006.01)
*B60R 22/26* (2006.01)

(52) U.S. Cl.
CPC .................. *B60R 22/26* (2013.01)

(58) Field of Classification Search
CPC ............. B60R 22/26; B60R 2022/263; B60R 2022/266; B60R 22/023; B60R 22/30
See application file for complete search history.

(56) References Cited

U.S. PATENT DOCUMENTS

| 4,973,083 | A | * | 11/1990 | Richards | B60R 22/26 |
| | | | | | 297/483 |
| 6,676,219 | B1 | * | 1/2004 | Brewer | B60R 22/023 |
| | | | | | 297/483 |
| 11,198,412 | B1 | * | 12/2021 | Kim | B60R 22/14 |
| 2017/0096121 | A1 | * | 4/2017 | Krishnamurty | B60R 22/18 |
| 2017/0267207 | A1 | * | 9/2017 | Pisaniello | B60R 22/34 |
| 2018/0022241 | A1 | * | 1/2018 | Jewkes | B60N 2/2866 |
| | | | | | 297/253 |

* cited by examiner

*Primary Examiner* — Karen Beck
*Assistant Examiner* — Daniel M. Keck
(74) *Attorney, Agent, or Firm* — Gibraltar Consulting LLC Patent Insider; Tariq S. Najee-Ullah

(57) ABSTRACT

Portable seatbelt systems, kits, and related methods of manufacture and use. A portable seatbelt system may be carried onto and temporarily or permanently installed to an automobile seat, and includes a back strap, a bottom strap, and a securement strap. The back strap may be secured to a backrest of the seat and the bottom strap may be secured to a bottom of the seat. A passenger may be seated in the seat and secured to the seat with the securement strap which attaches to the bottom strap. The securement strap secures the passenger in the seat and prevents the passenger from being ejected from the seat during a collision, a rollover, or another automobile incident.

11 Claims, 8 Drawing Sheets

PORTABLE SEATBELT SYSTEMS, KITS, AND METHODS

STATEMENT REGARDING FEDERALLY SPONSORED RESEARCH OR DEVELOPMENT

None.

CROSS-REFERENCE TO RELATED APPLICATIONS

Under provisions of 35 U.S.C. § 119(e), the Applicant claims the benefit of U.S. provisional application No. 63/118,889, filed Mar. 24, 2021, which is incorporated herein by reference. It is intended that the referenced application may be applicable to the concepts and embodiments disclosed herein, even if such concepts and embodiments are disclosed in the referenced application with different limitations and configurations and described using different examples and terminology.

FIELD

The disclosure relates to portable seatbelt systems, kits, and related methods of manufacture and use. A portable seatbelt system may be installed to an automobile seat and used to secure a passenger to the seat to prevent the passenger from being ejected from the seat during a collision, a rollover, or another automobile incident.

BACKGROUND

In many instances, the use of a seatbelt provides greater protection to passengers in the event of a collision or other type of vehicle incident compared to not using the seatbelt. However, despite this knowledge, many modes of transit, such as passenger trains, classic cars, charter buses, and school buses, may not have seatbelts. Passengers sit on the seats without securement to the seats and have a greater risk for injury in the event of a collision, rollover, or other incident. In addition, if the transit encounters an irregularity, such as a large bump or pothole during transport, passengers may be ejected from their seats which can increase risk of injury and distraction to the operator (e.g., train operator, bus driver, car driver, etc.).

Seatbelts may be omitted from these modes due to costs associated with installing the seatbelts or due to concerns about first responders being able to efficiently cut seatbelts to remove a large number of passengers from their seats, some panicking or unconscious, in a time-critical emergency such as a vehicle fire, a fall from a height, or a water rescue. A study of risks associated with a mode of transportation, a passenger or group of passengers, and a transportation route may suggest there is a greater benefit from having seatbelts installed for that vehicle/passenger/route combination than not having seatbelts installed. However, permanently installing seatbelts to the vehicle (e.g., train, bus, car, etc.) may limit the use of the vehicle to those vehicle/passenger/route combinations with the same or similar risk-benefit profiles or characteristics. This may prevent the vehicle from being safely operable for other passengers and/or routes and may reduce the usefulness and value of the vehicle or vehicle fleet.

Accordingly, there is a need for portable seatbelt systems, kits, and related methods to provide optional, temporary, enhanced, and/or modular seatbelt safety to passengers riding in any of a variety of vehicles on any of a variety of routes. The present invention addresses this unmet need.

SUMMARY

In one aspect, the disclosure provides a portable seatbelt system for temporary installation to a seat of a vehicle, the system including a back strap configured to be removably secured to a backrest of the seat, a bottom strap configured to be removably secured to a bottom of the seat, and a securement strap configured to be removably secured to the bottom strap to produce a three-point seatbelt arrangement. The securement strap may be one of a plurality of securement straps used to form one of a plurality of three-point seatbelt arrangements. When the back strap and the bottom strap are removably secured to the seat and a passenger is seated in the seat, the passenger is securable to the seat with removable securement of the securement strap to the bottom strap and is protectable from injury or ejection from the seat by the three-point seatbelt arrangement. If multiple three-point seatbelt arrangements are provided by the system, then multiple passengers may be securable and protectable by the system. The back strap and the bottom strap may be adjustable such that a range of differently sized vehicle seats may be accommodated, and the securement strap may be adjustable such that a range of differently sized passengers may be secured in the seat. A slide adjuster may be attached to the back strap and used to adjust the securement strap toward a constricted configuration to snugly secure the passenger therein.

In another aspect, the disclosure provides a method for securing a passenger to a seat of a vehicle, the method comprising removably attaching a back strap to a backrest of the seat, removably attaching a bottom strap to a bottom of the seat, seating the passenger in the seat, and removably attaching a securement strap to the bottom strap. The back strap, the bottom strap, and the securement strap may be provided as components of a portable seatbelt system of the disclosure, which may be configured for temporary installation to the seat of the vehicle.

In yet another aspect, the disclosure provides a kit comprising one or more portable seatbelt systems of the disclosure. In certain implementations, the kit includes a plurality of portable seatbelt systems and may be provided to a vehicle fleet management company or organization, such as a municipality, affiliate, or vendor, for temporary installation to all or a subset of vehicles of a fleet of vehicles or other transportation units, including but not limited to train cars, buses, school buses, and the like. In implementations, the kit includes one portable seatbelt system and may be provided to an individual or consumer for personal use, for example, the kit may be provided to a child for use on a school bus, to a commuter for use on a commuter train or bus, to a traveler for use on a public bus or a charter bus, and the like.

The invention generally relates to improved portable seatbelt systems which may be manufactured with appropriate materials and processes, and which may be scaled as needed.

Other objects, features, and advantages of the invention will become apparent from the following detailed description taken in conjunction with the accompanying drawings.

BRIEF DESCRIPTION OF THE DRAWINGS

Although the characteristic features of the invention will be particularly pointed out in the claims, the invention itself and manners in which it may be made and used may be

DETAILED DESCRIPTION OF THE INVENTION

Figure 1:
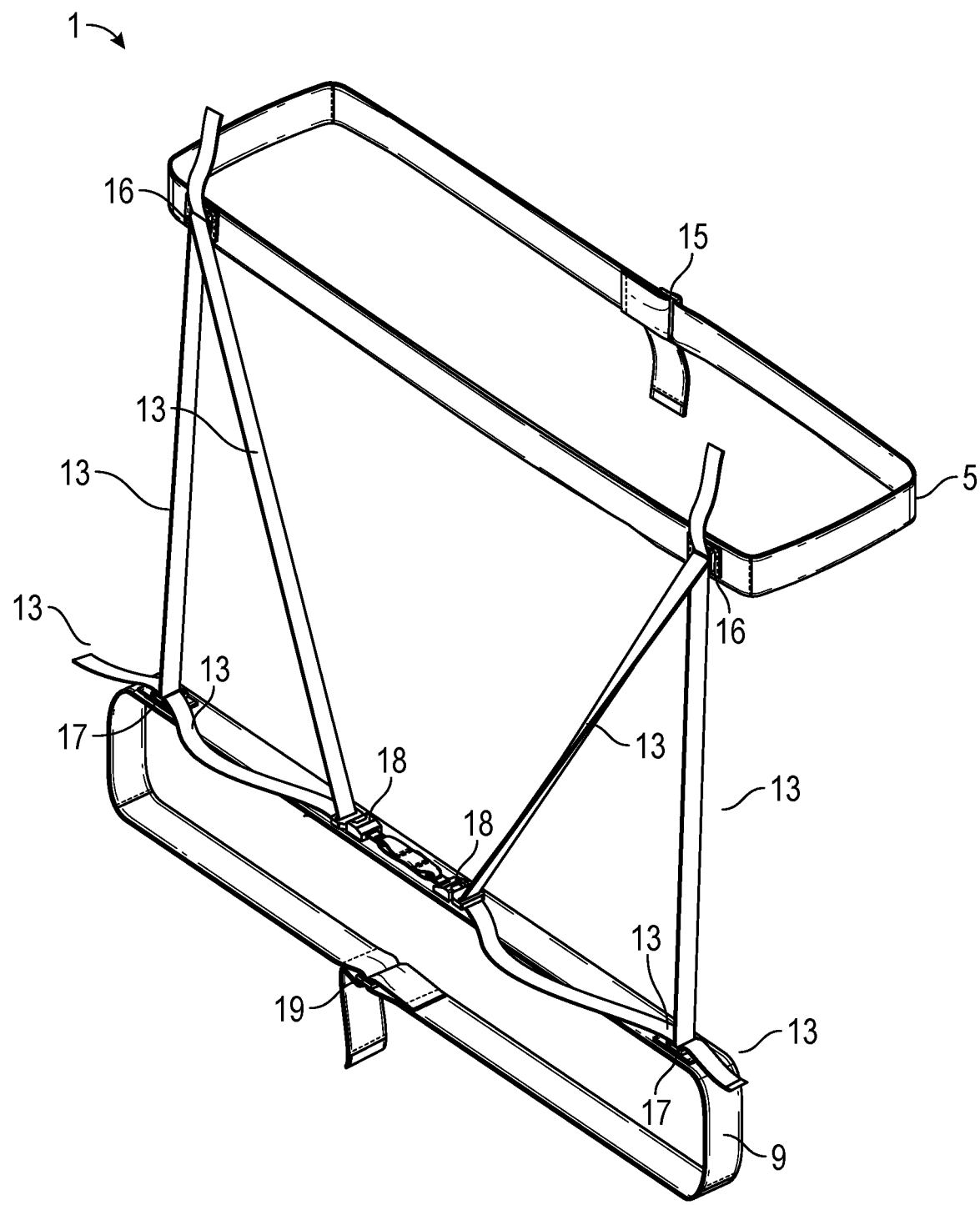
FIG. 1 depicts a perspective view of a first exemplary portable seatbelt system.

Reference is made herein to the attached drawings. Like reference numerals may be used in the drawings to indicate like or similar elements of the description. The figures are intended for representative purposes and should not be considered limiting.

The present disclosure can be understood more readily by reference to the following detailed description of the present disclosure and the examples included therein.

Before the present articles, systems, devices, and/or methods are disclosed and described, it is to be understood that they are not limited to specific implementations unless otherwise specified, or to particular approaches unless otherwise specified, as such can, of course, vary. It is also to be understood that the terminology used herein is for the purpose of describing aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

Definitions

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this present disclosure belongs. In this specification and in the claims which follow, reference will be made to a number of terms which shall be defined herein.

As used in the specification and the appended claims, the singular forms "a," "an," and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the present disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the present disclosure. Thus, if there are a variety of additional steps that can be performed it is understood that each of these additional steps can be performed with any specific aspect or combination of aspects of the methods of the present disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Portable Seatbelt Systems and Methods

Figure 2:
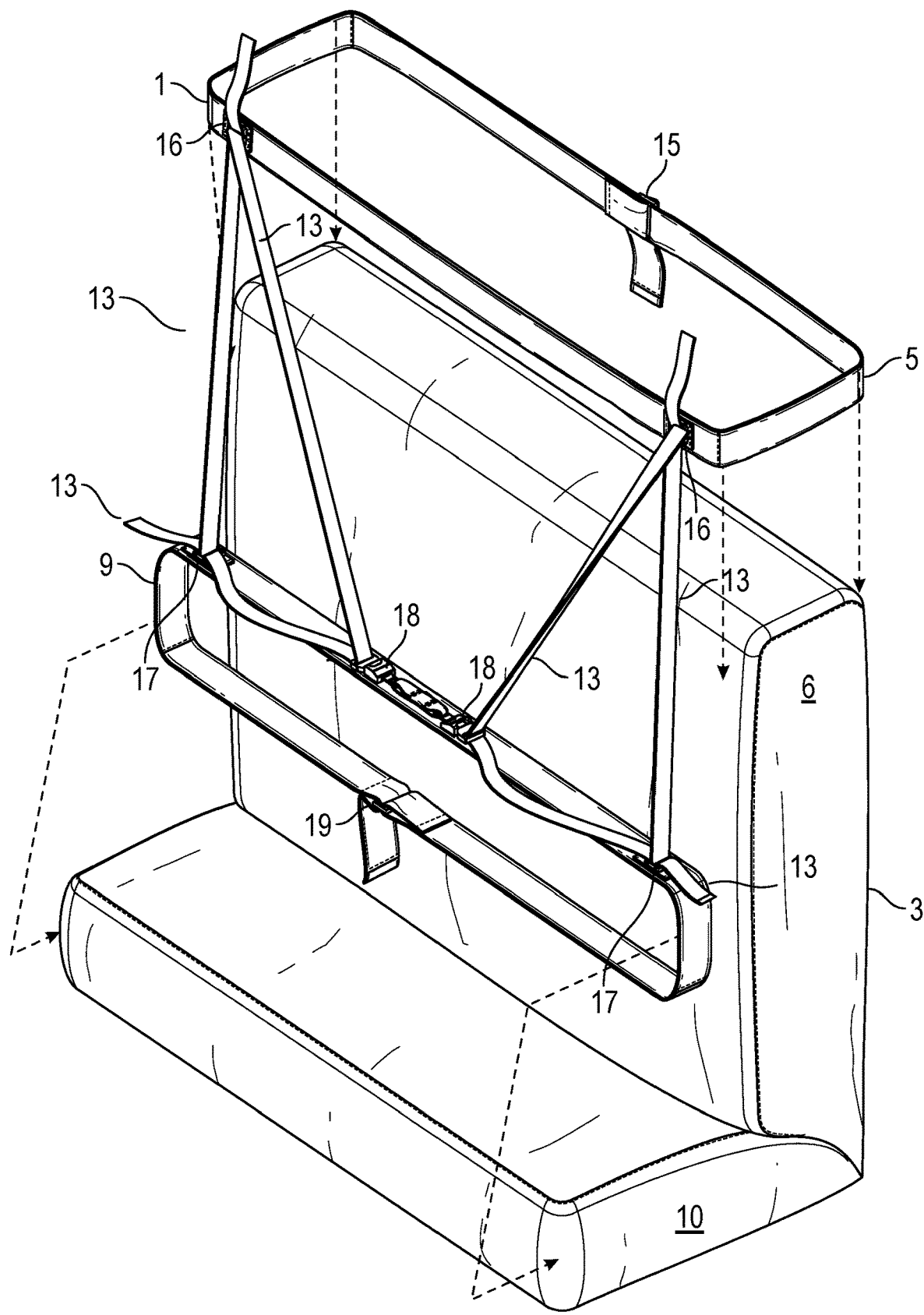
FIG. 2 depicts a perspective view of the first portable seatbelt system being attached to a first bus seat.
Figure 3:
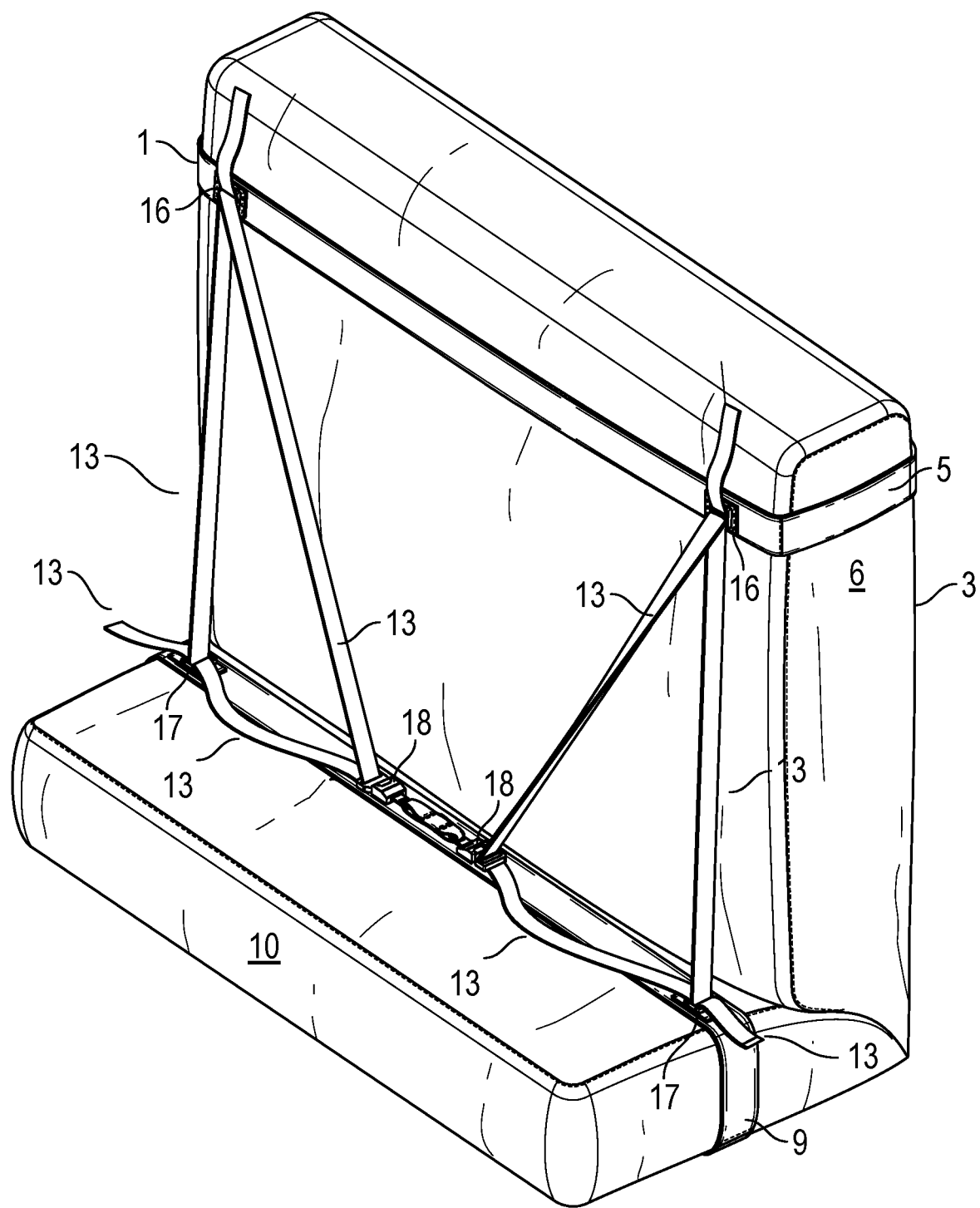
FIG. 3 depicts a perspective view of the first portable seatbelt system attached to the first bus seat.
Figure 4:
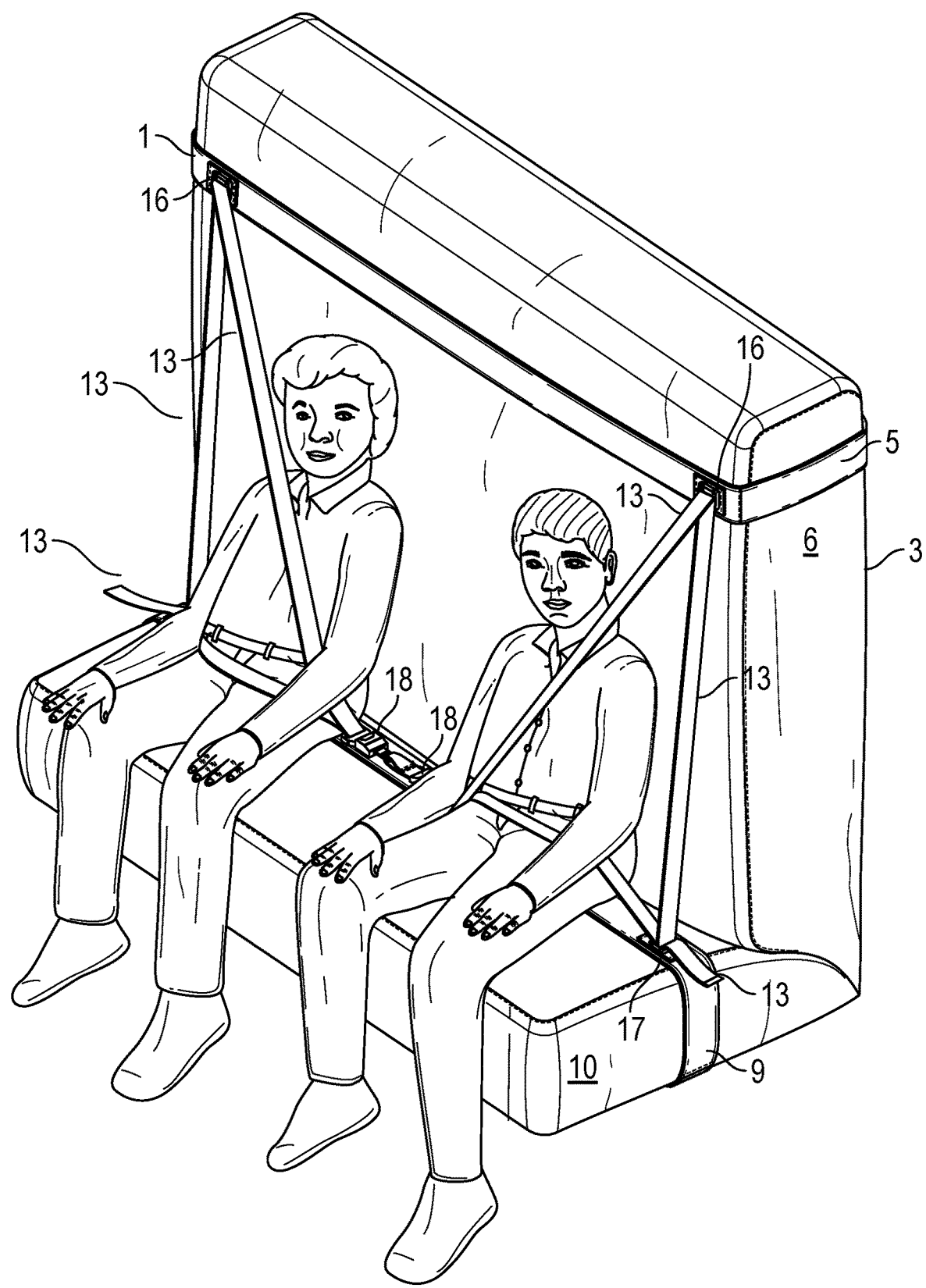
FIG. 4 depicts a perspective view of two passengers secured to the first bus seat by the first portable seatbelt system.

Referring now to FIGS. 1-4, there are depicted a perspective view of a first exemplary portable seatbelt system (FIG. 1), a perspective view of the first portable seatbelt system being attached to a first bus seat (FIG. 2), a perspective view of the first portable seatbelt system attached to the first bus seat (FIG. 3), and a perspective view of two passengers secured to the first bus seat by the first portable seatbelt system (FIG. 4). In various aspects, the disclosure provides a portable seatbelt system 1 (FIG. 1) for temporary installation to a seat 3 of a vehicle (FIGS. 2, 3). The system comprises a back strap 5 configured to be removably secured to a backrest 6 of the seat 3; a bottom strap 9 configured to be removably secured to a bottom 10 of the seat 3; a first securement strap 13 (e.g., securement strap 13 at right side of FIG. 1) configured to be removably secured to the bottom strap 9 to produce a first three-point seatbelt arrangement (e.g., three-point seatbelt arrangement at right side of FIG. 1); and a second securement strap 13 (e.g., securement strap 13 at left side of FIG. 1) configured to be removably secured to the bottom strap 9 to produce a second three-point seatbelt arrangement (e.g., three-point seatbelt arrangement at left side of FIG. 1). During use, the back strap 5 and the bottom strap 9 are removably secured to the seat 3 and a first passenger and a second passenger are seated in the seat 3 (FIG. 4). The first and second passengers are securable to the seat 3 with removable securement of the first and second securement straps 13 to the bottom strap 9 and are protectable from injury or ejection from the seat 3 by the first and second three-point seatbelt arrangements.

In general, the system 1 is configured for temporary installation to the seat 3 and the back strap 5 and the bottom strap 9 are detachable from the backrest 6 and the bottom 10 of the seat 3, respectively, by loosening the back strap 5 and the bottom strap 9. The back strap 5 and the bottom strap 9 may be tightened, loosened, and secured in place with operation of cam buckle 15 and cam buckle 19, respectively. Cam buckles 15, 19 provide securement mechanisms for securing opposite portions of the back strap 5 and the bottom strap 9, respectively. In this manner, the straps 5, 9 may be tightly secured to the seat 3 during use, and when the system 1 is to be removed from the seat 3, the cam buckles 15, 19 may be actuated to release the straps 5, 9, loosen the system 1 from the seat 3, and slip the straps 5, 9 over the backrest 6 and the bottom 10 of the seat 3 for removal. Accordingly, in various implementations, a diameter of the back strap 5 and a diameter of the bottom strap 9 are individually adjustable to accommodate a range of shapes and sizes of vehicle seats 3 and secure the system 1 in place in a variety of different vehicles and modes of transportation.

In implementations, the securement straps 13 are configured for use as three-point seatbelt systems. A diameter of the first securement strap 13 and a diameter of the second securement strap 13 may be individually adjustable to accommodate a range of shapes and sizes of passengers. This may be accomplished with operation of one or more slide adjusters 16, which may be used to pass portions of the securement strap 13 therethrough and secure the securement strap 13 in place to secure the passenger therein.

In various implementations, the first and second securement straps 13 are removably securable to the bottom strap 9 by first and second buckles 18 and are adjustable toward constricted configurations by pulling webbing of the securement straps 13 through first and second slide adjusters 16 of the back strap. The first and second buckles 18 may be any suitable seatbelt buckle type, but in certain implementations, may be extender buckles 18 which are affixed to the bottom strap 9 on a first portion thereof, e.g., by stitching, and are affixed to a buckle receiver on a second portion thereof, e.g., by insertion of webbing through a loop of the buckle receiver. The buckle receivers of the extender buckles 18 are configured to receive buckle insertions that are slidably attached to the securement straps 13.

In various implementations, the securement strap 13 may be pulled downward at a vertical portion thereof such that lower excess webbing may be pulled through a slide adjuster 17 affixed to the bottom strap 9, and the opposite end of the securement strap may be affixed, at an attachment point, to the bottom strap 9 or a portion of the slide adjuster 17, e.g., by stitching. The diameter of the three-point seatbelt arrangement may therefore be related to a distance between the slide adjuster 17 and the attachment point of the opposite end of the securement strap 13. To decrease the diameter of the securement strap 13 and tighten the three-point seatbelt system, an individual (e.g., a passenger, a bus driver, a teacher, a personal assistant, etc.) may pull the lower excess webbing outward through the slide adjuster 17 and pull downward on the vertical portion of the securement strap 13. To increase the diameter of the securement strap 13 and loosen the three-point seatbelt system, the individual may pull the vertical portion of the securement strap 13 upward to pull the lower excess webbing inward through the slide adjuster 17.

In various instances, upper excess webbing of the securement straps 13 (e.g., loops) may extend upward out of slide adjusters 16 when the system 1 is not installed to the seat 3 (FIGS. 1-3), but when installed and tightened to the seat 3 and the passengers (FIG. 4), the upper excess webbing may not be visible due to tightening of the securement straps 13. The upper excess webbing may be present when the securement straps 13 are tightened or loosened, and/or when portions of the system 1 are adjusted to accommodate differently sized passengers. In this manner, the system 1 may be highly adjustable and customizable as needed.

In various implementations, the lower and/or the upper excess webbing may be connected to and automatically pulled by a bias mechanism (e.g., a seatbelt retractor; not shown) which automatically decreases the diameter of the securement strap 13 and tightens the three-point seatbelt system. However, in certain instances, the tightening and loosening of the portable seatbelt system may be accomplished manually, in addition to or alternative to the bias mechanism, as in the shown embodiments. In this manner, the seatbelt system may involve manual configuration, and may be portable and easy to install, customize, and use.

Figure 5:
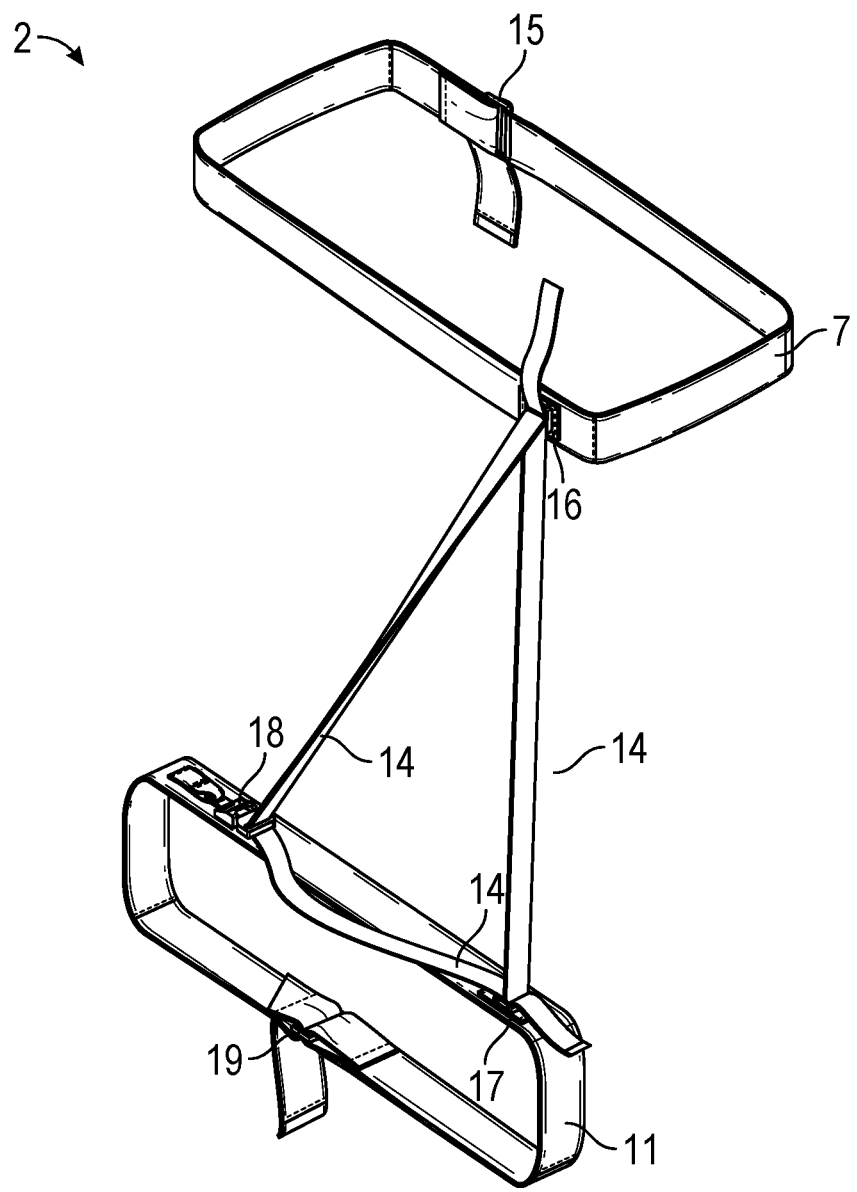
FIG. 5 depicts a perspective view of a second exemplary portable seatbelt system.
Figure 6:
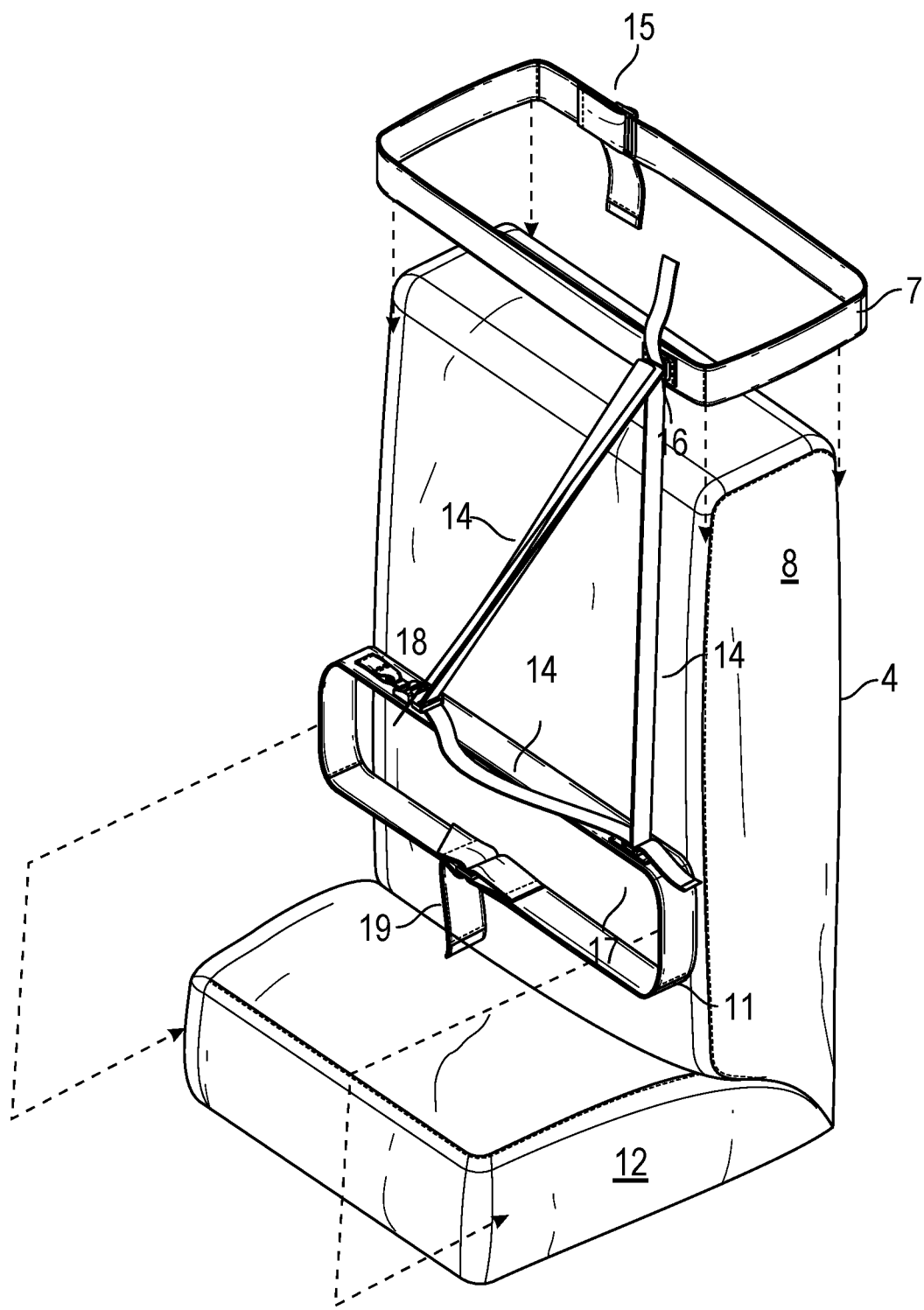
FIG. 6 depicts a perspective view of the second portable seatbelt system being attached to a second bus seat.
Figure 7:
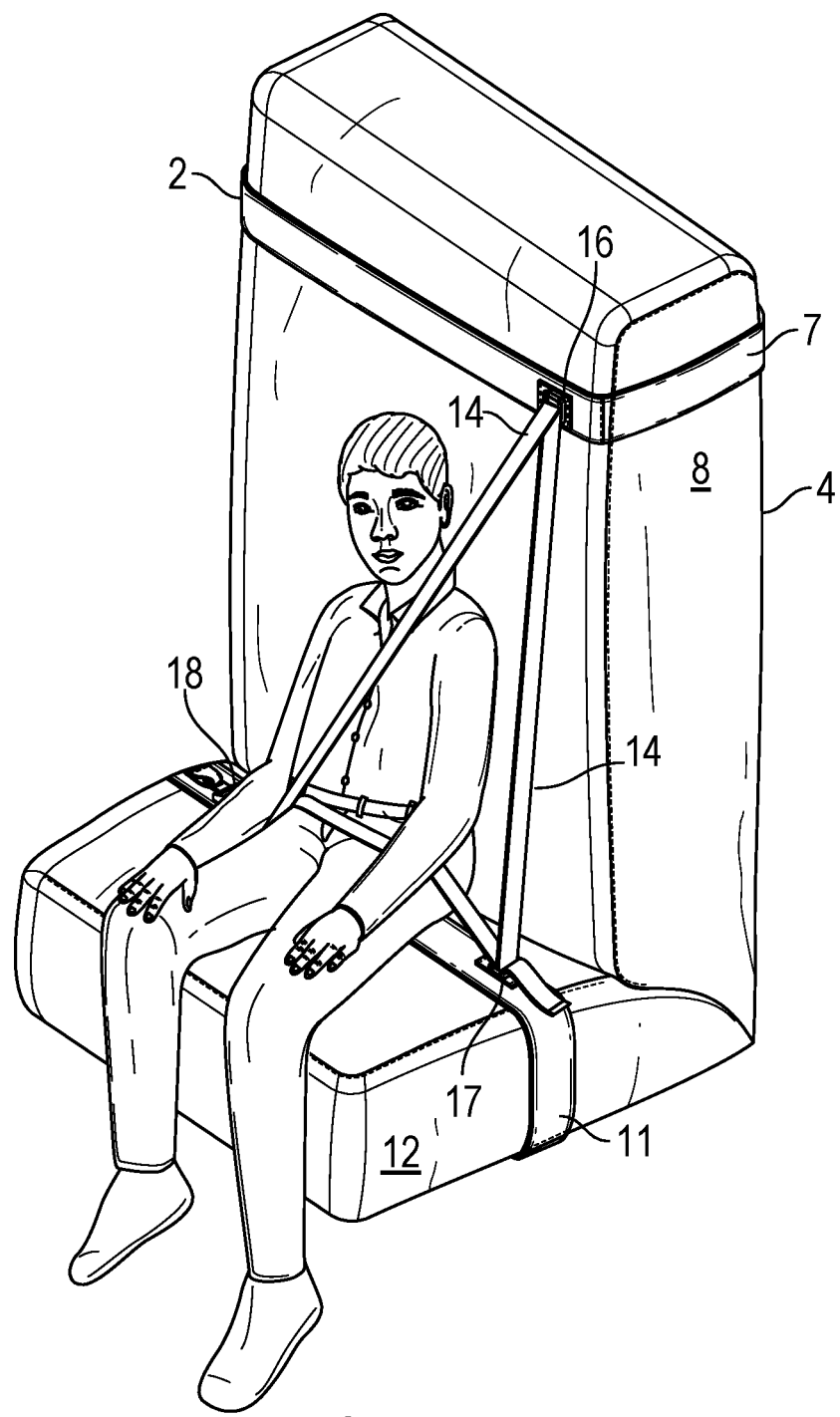
FIG. 7 depicts a perspective view of one passenger secured to the second bus seat by the second portable seatbelt system.

Referring now to FIGS. 5-7, there are depicted a perspective view of a second exemplary portable seatbelt system (FIG. 5), a perspective view of the second portable seatbelt system being attached to a second bus seat (FIG. 6), and a perspective view of one passenger secured to the second bus seat by the second portable seatbelt system (FIG. 7). In various aspects, the disclosure provides a portable seatbelt system 2 for temporary installation to a seat 4 of a vehicle, the system 2 comprising: a back strap 7 configured to be removably secured to a backrest 8 of the seat 4; a bottom strap 11 configured to be removably secured to a bottom 12 of the seat 4; and a securement strap 14 configured to be removably secured to the bottom strap 11 to produce a three-point seatbelt arrangement. During use, the back strap 7 and the bottom strap 11 are removably secured to the seat 4 and a passenger is seated in the seat 4 (FIG. 7). The passenger is securable to the seat 4 with removable securement of the securement strap 14 to the bottom strap 1 and is protectable from injury or ejection from the seat 4 by the three-point seatbelt arrangement.

In general, the system 2 is configured for temporary installation to the seat 4 and the back strap 7 and the bottom strap 11 are detachable from the backrest 8 and the bottom 12 of the seat 4, respectively, by loosening the back strap 7 and the bottom strap 11. The back strap 7 and the bottom strap 11 may be tightened, loosened, and secured in place with operation of cam buckle 15 and cam buckle 19, respectively. Cam buckles 15, 19 provide securement mechanisms for securing opposite portions of the back strap 7 and the bottom strap 11, respectively. In this manner, the straps 7, 11 may be tightly secured to the seat 4 during use, and when the system 2 is to be removed from the seat 4, the cam buckles 15, 19 may be actuated to release the straps 7, 11, loosen the system 2 from the seat 4, and slip the straps 7, 11 over the backrest 8 and the bottom 12 of the seat 4 for removal. Accordingly, in various implementations, a diameter of the back strap 7 and a diameter of the bottom strap 11 are individually adjustable to accommodate a range of shapes and sizes of vehicle seats 4 and secure the system 2 in place in a variety of different vehicles and modes of transportation.

In implementations, the securement strap 14 is configured for use as a three-point seatbelt system. A diameter of the securement strap 14 may be individually adjustable to accommodate a range of shapes and sizes of passengers. This may be accomplished with operation of slide adjuster 16, which may be used to pass portions of the securement strap 14 therethrough and secure the securement strap 14 in place to secure the passenger therein.

In various implementations, the securement straps 14 is removably securable to the bottom strap 11 by buckle 18 and are adjustable toward constricted configurations by pulling webbing of the securement straps 14 through slide adjuster 16 of the back strap. The buckle 18 may be any suitable seatbelt buckle type, but in certain implementations, may be an extender buckle 18 which is affixed to the bottom strap 11 on a first portion thereof, e.g., by stitching, and is affixed to a buckle receiver on a second portion thereof, e.g., by insertion of webbing through a loop of the buckle receiver. The buckle receiver of the extender buckle 18 is configured to receive a buckle insertion that is slidably attached to the securement strap 14.

In various implementations, the securement strap 14 may be pulled downward at a vertical portion thereof such that lower excess webbing may be pulled through a slide adjuster 17 affixed to the bottom strap 11, and the opposite end of the securement strap may be affixed, at an attachment point, to the bottom strap 11 or a portion of the slide adjuster 17, e.g., by stitching. The diameter of the three-point seatbelt arrangement may therefore be related to a distance between the slide adjuster 17 and the attachment point of the opposite end of the securement strap 14. To decrease the diameter of the securement strap 14 and tighten the three-point seatbelt system, an individual (e.g., a passenger, a bus driver, a teacher, a personal assistant, etc.) may pull the lower excess webbing outward through the slide adjuster 17 and pull downward on the vertical portion of the securement strap 14. To increase the diameter of the securement strap 14 and loosen the three-point seatbelt system, the individual may pull the vertical portion of the securement strap 14 upward to pull the lower excess webbing inward through the slide adjuster 17.

In various instances, upper excess webbing of the securement straps 14 (e.g., loops) may extend upward out of slide adjusters 16 when the system 2 is not installed to the seat 4 (FIGS. 5, 6), but when installed and tightened to the seat 4 and the passengers (FIG. 7), the upper excess webbing may not be visible due to tightening of the securement straps 14. The upper excess webbing may be present when the securement straps 14 are tightened or loosened, and/or when portions of the system 2 are adjusted to accommodate differently sized passengers. In this manner, the system 2 may be highly adjustable and customizable as needed.

In various implementations, the lower and/or the upper excess webbing may be connected to and automatically pulled by a bias mechanism (e.g., a seatbelt retractor; not shown) which automatically decreases the diameter of the securement strap 14 and tightens the three-point seatbelt system. However, in certain instances, the tightening and loosening of the portable seatbelt system may be accomplished manually, in addition to or alternative to the bias mechanism, as in the shown embodiments. In this manner, the seatbelt system may involve manual configuration, and may be portable and easy to install, customize, and use.

Figure 8:
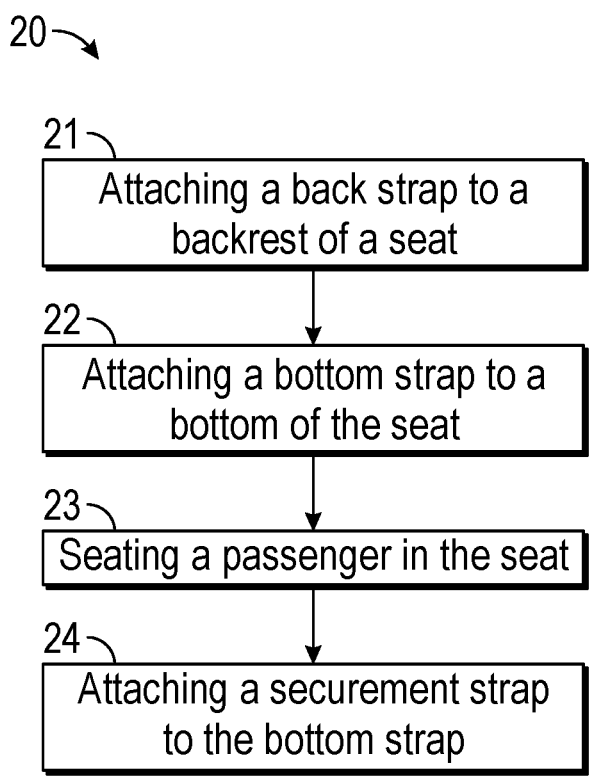
FIG. 8 depicts a flowchart of a method for securing a passenger to a seat of a vehicle.

Referring now to FIG. 8, there is depicted a flowchart of a method for securing a passenger to a seat of a vehicle. In various aspects, the disclosure provides a method 20 for securing a passenger to a seat of a vehicle, the method comprising removably attaching 21 a back strap to a backrest of the seat, removably attaching 22 a bottom strap to a bottom of the seat, seating 23 the passenger in the seat, and removably attaching 24 a securement strap to the bottom strap. The back strap, the bottom strap, and the securement strap may be provided as components of a portable seatbelt system of the disclosure, which may be configured for temporary installation to the seat of the vehicle.

In various aspects, the disclosure also provides a kit comprising one or more portable seatbelt systems of the disclosure. In certain implementations, the kit includes a plurality of portable seatbelt systems and may be provided to a vehicle fleet management company or organization, such as a municipality, affiliate, or vendor, for temporary installation to all or a subset of vehicles of a fleet of vehicles or other transportation units, including but not limited to train cars, buses, school buses, and the like. In implementations, the kit includes one portable seatbelt system and may be provided to an individual or consumer for personal use, for example, the kit may be provided to a child for use on a school bus, to a commuter for use on a commuter train or bus, to a traveler for use on a public bus or a charter bus, and the like.

The various straps of the disclosure (e.g., a back strap, a bottom strap, and a securement strap) may be implemented with seatbelt webbing, in particular embodiments. However, in other embodiments, alternate materials and/or methods may be implemented without departing from the scope of the disclosure. In this manner, the disclosure provides portable seatbelt systems that may be implemented with any suitable materials and/or methods, whether known or unknown, developed or not developed, or to be known or developed in the future.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior present disclosure. Further, the dates of publication provided herein can be different from the actual publication dates, which can require independent confirmation.

The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Insofar as the description above and the accompanying drawing disclose any additional subject matter that is not within the scope of the claims below, the disclosures are not dedicated to the public and the right to file one or more applications to claims such additional disclosures is reserved.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

The following is claimed:

1. A portable seatbelt system for temporary installation to a seat of a vehicle, the system comprising:
   a back strap configured to be removably secured to a backrest of the seat;
   a bottom strap configured to be removably secured to a bottom of the seat;
   a securement strap configured to be removably secured to the bottom strap to produce a three-point seatbelt arrangement; and
   wherein the securement strap comprises a first securement strap and a second securement strap which are removably securable to the bottom strap by first and second buckles and are adjustable toward constricted configurations by first and second slide adjusters of the back strap.

2. The system of claim 1, wherein the back strap and the bottom strap are removably secured to the seat and a passenger is seated in the seat, the passenger is:
   securable to the seat with removable securement of the securement strap to the bottom strap; and
   protectable from injury or ejection from the seat by the three-point seatbelt arrangement.

3. The system of claim 2, wherein a circumference of the back strap and a circumference of the bottom strap are individually adjustable to accommodate a range of shapes and sizes of vehicle seats.

4. The system of claim 2, wherein a circumference of the securement strap is individually adjustable to accommodate a range of shapes and sizes of passengers.

5. The system of claim 2, wherein the securement strap is removably securable to the bottom strap by a buckle and is adjustable toward a constricted configuration by a slide adjuster of the back strap.

6. The portable seatbelt system for temporary installation to the seat of a vehicle of claim 1 wherein the vehicle is at least one of a train, amusement park seat, a wheelchair, an automobile, an autobus, an airplane, a stagecoach, a subway train, and other common modes of transportation.

7. A portable seatbelt system for temporary installation to a seat of a vehicle, the system comprising:
   a back strap configured to be removably secured to a backrest of the seat;
   a bottom strap configured to be removably secured to a bottom of the seat;

a first securement strap configured to be removably secured to the bottom strap to produce a first three-point seatbelt arrangement; and a second securement strap configured to be removably secured to the bottom strap to produce a second three-point seatbelt arrangement;

wherein the back strap and the bottom strap are removably secured to the seat and a first passenger and a second passenger are seated in the seat, the first and second passengers are:

securable to the seat with removable securement of the first and second securement straps to the bottom strap; and protectable from injury or ejection from the seat by the first and second three-point seatbelt arrangements.

8. The system of claim 7, wherein a circumference of the back strap and a circumference of the bottom strap are individually adjustable to accommodate a range of shapes and sizes of vehicle seats.

9. The system of claim 7, wherein a circumference of the first securement strap and a circumference of the second securement strap are individually adjustable to accommodate a range of shapes and sizes of passengers.

10. The system of claim 7, wherein the first and second securement straps are removably securable to the bottom strap by first and second buckles and are adjustable toward constricted configurations by first and second slide adjusters of the back strap.

11. A portable seatbelt system for temporary installation to a seat of a vehicle, the system comprising:

a back strap configured to be removably secured to a backrest of the seat; a bottom strap configured to be removably secured to a bottom of the seat;

a first securement strap configured to be removably secured to the bottom strap to produce a first three-point seatbelt arrangement; and a second securement strap configured to be removably secured to the bottom strap to produce a second three-point seatbelt arrangement;

wherein a circumference of the back strap and a circumference of the bottom strap are individually adjustable to accommodate a range of shapes and sizes of vehicle seats;

wherein a circumference of the first securement strap and a circumference of the second securement strap are individually adjustable to accommodate a range of shapes and sizes of passengers;

wherein the first and second securement straps are removably securable to the bottom strap by first and second buckles and are adjustable toward constricted configurations by first and second slide adjusters of the back strap; and wherein the back strap and the bottom strap are removably secured to the seat and a first passenger and a second passenger are seated in the seat, the first and second passengers are:

securable to the seat with removable securement of the first and second securement straps to the bottom strap; and protectable from injury or ejection from the seat by the first and second three-point seatbelt arrangements.

* * * * *